United States Patent
Bernardo et al.

(10) Patent No.: US 11,767,376 B2
(45) Date of Patent: Sep. 26, 2023

(54) CATALYST MIXTURE

(71) Applicant: ARLANXEO NETHERLANDS B.V., Geleen (NL)

(72) Inventors: Raffaele Bernardo, Maastricht (NL); Gerardus Van Doremaele, Munstergeleen (NL); Wouter Van Meerendonk, Sittard (NL); Peter Windmuller, Landgraaf (NL)

(73) Assignee: ARLANXEO NETHERLANDS B.V., Geleen (NL)

( * ) Notice: Subject to any disclaimer, the term of this patent is extended or adjusted under 35 U.S.C. 154(b) by 301 days.

(21) Appl. No.: 17/276,437

(22) PCT Filed: Sep. 17, 2019

(86) PCT No.: PCT/EP2019/074869
§ 371 (c)(1),
(2) Date: Mar. 15, 2021

(87) PCT Pub. No.: WO2020/058267
PCT Pub. Date: Mar. 26, 2020

(65) Prior Publication Data
US 2022/0056162 A1 Feb. 24, 2022

(30) Foreign Application Priority Data
Sep. 18, 2018 (EP) .................... 18195257

(51) Int. Cl.
*C08F 4/6592* (2006.01)
*C08F 236/20* (2006.01)
*C08L 23/08* (2006.01)
*C08F 4/659* (2006.01)
*C08F 210/18* (2006.01)

(52) U.S. Cl.
CPC ........ *C08F 4/6592* (2013.01); *C08F 4/65904* (2013.01); *C08F 210/18* (2013.01); *C08L 23/0823* (2013.01); *C08F 236/20* (2013.01); *C08L 23/0815* (2013.01)

(58) Field of Classification Search
CPC . C08F 4/65904; C08F 236/20; C08L 23/0823
See application file for complete search history.

(56) References Cited

U.S. PATENT DOCUMENTS

| | | | |
|---|---|---|---|
| 6,153,776 A | 11/2000 | Patton et al. | |
| 10,316,113 B2* | 6/2019 | Berthoud | C08F 4/027 |
| 10,472,431 B2* | 11/2019 | Karbaum | C08F 10/02 |
| 2013/0079478 A1 | 3/2013 | Van Doremaele et al. | |
| 2016/0115265 A1 | 4/2016 | Scott et al. | |
| 2016/0122370 A1 | 5/2016 | Berthoud et al. | |
| 2017/0240663 A1 | 8/2017 | Karbaum et al. | |

FOREIGN PATENT DOCUMENTS

| | | |
|---|---|---|
| CN | 1270596 A | 10/2000 |
| CN | 103025770 A | 4/2013 |
| CN | 105324388 A | 2/2016 |
| CN | 106687468 A | 5/2017 |
| EP | 2354170 A1 | 8/2011 |
| EP | 327276 A1 | 1/2018 |

(Continued)

OTHER PUBLICATIONS

EP Search Report for corresponding application EP 18195257.3 dated Apr. 5, 2019.
Database WPI, Week 201846, Thomson Scientific, London, GB; AN 2018-42548F, XP002789975, KR 20180055531 A (LG Chem Ltd) dated May 25, 2018.
Database WPI, Week 201565, Thomson Scientific, London, GB; AN 2015-41965T; XP002789976, KR 20150081925 A (LG Chem Ltd) dated Jul. 15, 2015.

(Continued)

*Primary Examiner* — Caixia Lu
(74) *Attorney, Agent, or Firm* — Norris McLaughlin PA

(57) ABSTRACT

The present invention relates to a catalyst mixture containing at least one metal complex according to the formula (1)

$$CyLMZ_p \quad (1),$$

and at least one metal complex according to the formula (2)

$$InLMZ_p \quad (2),$$

wherein
Cy is a substituted cyclopentadienyl ligand that contains the substituents $R^1$, $R^2$ and 3 additional methyl groups, wherein
$R^1$ means H, halogen or a $C_3$-$C_{20}$ substituent and
$R^2$ means a $C_1$-$C_{20}$ substituent,
In is an indenyl ligand, optionally substituted with one or more substituents $R^3$, wherein the one or more substituents $R^3$ mean independently $C_1$-$C_{20}$ hydrocarbyl substituents,
and independently for each formula (1) and (2)
M is a group 4 metal
Z independently is an anionic ligand,
p is number of 1 to 2, preferably 2, and
L is an amidinate ligand of the formula (3)

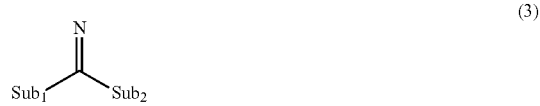

wherein the amidine-containing ligand is covalently bonded to the metal M via the imine nitrogen atom, and Sub1 is a substituent comprising a group 14 atom through which Sub1 is bonded to the imine carbon atom and Sub2 is a substituent comprising a heteroatom of group 15, through which Sub2 is bonded to the imine carbon atom.

16 Claims, 1 Drawing Sheet

(56) References Cited

FOREIGN PATENT DOCUMENTS

| KR | 20150051925 A | 7/2015 |
| KR | 20180055531 A | 5/2018 |
| WO | 2005090418 A1 | 5/2018 |

OTHER PUBLICATIONS

International Preliminary Report on Patentability in corresponding application PCT/EP2019/074869 dated Mar. 23, 2021.
International Search Report for corresponding application PCT/EP2019/074869 dated Jan. 2, 2020.

\* cited by examiner

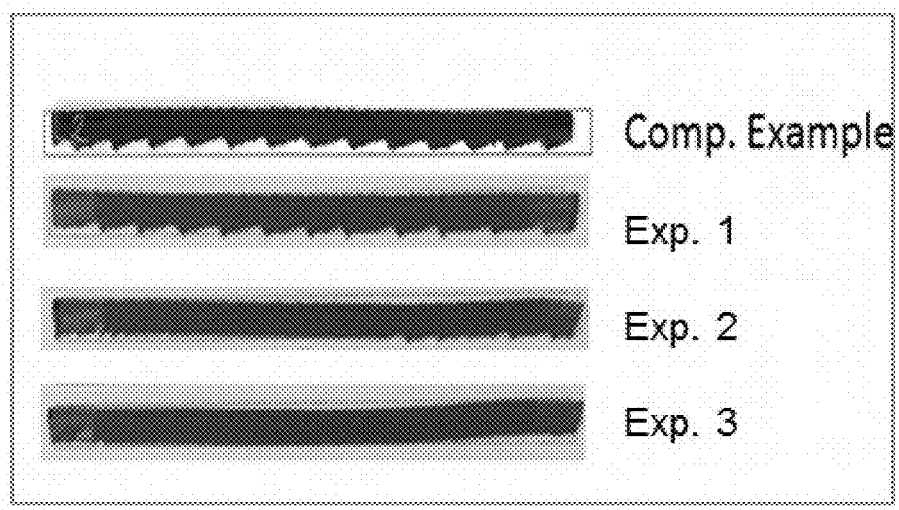

CATALYST MIXTURE

This application claims all available priority benefit to PCT/EP2019/074869 filed 17 Sep. 2019, as well as to EP 18195257.3 filed 18 Sep. 2018, and incorporates by reference the entire contents of those applications herein.

The present invention relates to a catalyst complex mixture, containing at least two different metal complexes, a polymerization process to make polymers and the polymers obtained thereby.

BACKGROUND OF INVENTION

Elastomeric polymers are generally processed in the form of a compound, wherein the polymer is mixed with fillers like carbon black and/or oil. When a polymer is extruded through a die, typical phenomena that may occur are surface distortion, die swell or even gross melt fracture, especially in low filled recipes. Compounds suitable for extrusion should not require high torques and pressure during processing and should not be prone to surface distortion. It is known that lowering the viscosity of a compound give rise to improved extrusion behavior.

Lower viscosities can be achieved with the introduction of long chain branching or via dilution of the major polymer fraction by a further polymer fraction with a lower molecular weight. This can be achieved via techniques known in the art, such as polymer blending or mixing, addition of oil to the polymer or production of a polymer via catalyst mixtures. Such approaches, whilst lowering the overall viscosity of the final polymer, generally result in a deterioration of the compound physical properties, such as tensile strength or compression sets.

Good polymer properties were reported in WO2005090418 by the use of catalysts containing amidinate ligands.

WO2005090418 discloses a process for the copolymerization of ethylene and at least one additional alpha olefin having from 3 to 8 carbon atoms. Furthermore, WO2005090418 discloses also a process for the copolymerisation of ethylene, alpha olefin and one or more non conjugated dienes, whereby the highest molecular weight (or intrinsic viscosity (IV)) polymer is made using the amidinato catalysts comprising a pentamethylcyclopentadienyl (Cp*) ligand. This result can be even further improved by similar catalysts with a special substitution pattern at the Cp ring as known from EP3272761.

The object of the present invention is to provide a catalysts that can overcome the drawbacks known from the prior art.

Surprisingly, better properties, in particular in both processing and physical properties can be achieved via the use of two amidinato catalysts.

The invention therefore relates to a catalyst complex mixture containing at least one metal complex according to the formula (1)

(1), and at least one metal complex according to the formula (2)

(2), wherein
Cy is a substituted cyclopentadienyl ligand that contains the substituents $R^1$, $R^2$ and 3 additional methyl groups, wherein
$R^1$ means H, halogen or a $C_3$-$C_{20}$ substituent and $R^2$ means a $C_1$-$C_{20}$ substituent,
In is an indenyl ligand, optionally substituted with one or more, in particular 1 to 7, substituents $R^3$, wherein the one or more substituents $R^3$ mean independently $C_1$-$C_{20}$ hydrocarbyl substituents, such as methyl groups,
and independently for each formula (1) and (2)
M is a group 4 metal
Z independently is an anionic ligand,
p is number of 1 to 2, preferably 2, and
L is an amidinate ligand of the formula (3)

wherein the amidine-containing ligand is covalently bonded to the metal M via the imine nitrogen atom, and Sub1 is a substituent comprising a group 14 atom through which Sub1 is bonded to the imine carbon atom and Sub2 is a substituent comprising a heteroatom of group 15, through which Sub2 is bonded to the imine carbon atom.

An amidinate ligand or amidine-containing ligand in the sense of the present invention is thus a ligand which is defined as above. It has a general structure similar to that of optionally substituted amidines although molecules may be substituted like described above.

PREFERRED EMBODIMENTS

M

In a preferred embodiment the metal M of group 4 in formulas (1) and (2) independently of each other is titanium (Ti), zirconium (Zr) or hafnium (Hf), most preferably titanium. Even more preferred M in formula (1) and (2) respectively is titanium.

Z

In a preferred embodiment Z independently is selected from the group consisting of halogen, a $C_{1-10}$ alkyl group, a $C_{7-20}$ aralkyl group, a $C_6$-20 aryl group or a $C_{1-20}$ hydrocarbon-substituted amino group, and more preferably, a halogen atom and a $C_{1-10}$ alkyl group, most preferably Cl, F, Br, methyl, benzyl, methyltrimethylsilyl, phenyl, methoxyphenyl, dimethoxyphenyl, N,N-dimethylaminophenyl, bis-(N,N-dimethylamino)phenyl, fluorophenyl, difluorophenyl, trifluorophenyl, tetrafluorophenyl, perfluorophenyl, trialkylsilylphenyl, bis(trialkylsilyl)phenyl and tris(trialkylsilyl)phenyl. Most preferred Z is methyl or benzyl. In case p is more than 1, means p=2, the given meanings for Z are independent. Preferably p=2 and both Z are identical.

L

In an preferred embodiment in formula (1) and (2) respectively independently of each other Sub1 of the ligand L of formula (3) is a substituted or unsubstituted C6-C20 aryl residue, in particular phenyl, 2,6-dimethylphenyl, 2,6-dichlorophenyl or 2,6-difluorophenyl.

In a preferred embodiment in formula (1) and (2) respectively independently of each other Sub2 of the ligand L of formula (3) is of the general formula —$NR^4R^5$ with W and $R^5$ being individually selected from the group consisting of aliphatic C1-C20 hydrocarbyl, halogenated C1-C20 aliphatic hydrocarbyl, aromatic C6-C20 hydrocarbyl and halogenated aromatic C6-C20 hydrocarbonyl residues or $R^4$ optionally forming a heterocyclic ring with $R^5$ or Sub1. Most preferred examples for Sub2 are dimethylamine, diisopropylamine, biscyclohexylamine and piperidinyl in particular 1-piperidinyl.

It may be preferred that in formula (2) ligand L of formula (3) Sub1 is phenyl and Sub2 is diisopropylamino or piperidinyl.

It may further be preferred that in formula (1) ligand L of formula (3) Sub1 is 2,6-difluorophenyl and Sub2 is diisopropylamino or piperidinyl.

A further embodiment of the invention relates to the catalyst complex mixture of metal complexes of formula (1) and (2) having an L of the formula (3), wherein Sub1 is an alkyl residue. Typical examples for such a preferred Sub1 are linear, branched or cyclic alkyl residue with 1 to 20 carbon atoms, unsubstituted or substituted with halogen, amido, silyl or C6-C20 aryl radicals. Examples for such Sub1 are methyl, hexyl, cyclohexyl, iso-propyl, tert-butyl, benzyl, trifluoromethyl, 2,6-dimethyl benzyl, 2,6-difluoro benzyl and 2,6-difluoro benzyl.

Most preferred examples of the amidinate-containing ligand represented by the formula (3) are based on protio-amidines of the formula (3a)

(3a)

Examples include N,N-dimethylacetimidamide, N,N-diisopropylacetimidamide, N,N-dicyclohexylacetimidamide, N-(2,6-dimethylphenyl)-N-ethylacetimidamide, N,N-dimethylisobutyrimidamide, N,N-diisopropylisobutyrimidamide, N,N-dicyclohexylisobutyrimidamide, N-(2,6-dimethylphenyl)-N-ethylisobutyrimidamide, N,N-dimethylcyclohexanecarboximidamide, N,N-diisopropylcyclohexanecarboximidamide, N,N-dicyclohexylcyclohexanecarboximidamide, N-(2,6-dimethylphenyl)-N-ethylcyclo-hexanecarboximidamide, N,N-dimethylpivalimidamide, N,N-diisopropylpivalimidamide, N,N-dicyclohexylpivalimidamide, N-(2,6-dimethylphenyl)-N-ethylpivalimidamide, 2,2,2-trifluoro-N,N-dimethylacetimidamide, 2,2,2-trifluoro-N,N-diisopropylacetimidamide, N,N-dicyclohexyl-2,2,2-trifluoroacetimidamide, N-(2,6-dimethylphenyl)-N-ethyl-2,2,2-trifluoroacetimidamide, 2-(phenyl)-N,N-dimethylacetimidamide, 2-(phenyl)-N,N-diisopropylacetimidamide, N,N-dicyclohexyl-2-(phenyl) acetimidamide, 2-(phenyl)-N-(2,6-dimethylphenyl)-N-ethylacetimidamide, 2-(2,6-dimethylphenyl)-N,N-dimethylacetimidamide, 2-(2,6-dimethylphenyl)-N,N-diisopropylacetimidamide, N,N-dicyclohexyl-2-(2,6-dimethylphenyl)acetimidamide, N,2-bis(2,6-dimethylphenyl)-N-ethylacetimidamide, 2-(2,6-difluorophenyl)-N,N-dimethylacetimidamide, 2-(2,6-difluorophenyl)-N,N-diisopropylacetimidamide, N,N-dicyclohexyl-2-(2,6-difluorophenyl)acetimidamide, 2-(2,6-difluorophenyl)-N-(2,6-dimethylphenyl)-N-ethylacetimidamide, N,N-dimethylbenzimidamide, N,N-diisopropylbenzimidamide, N,N-dicyclohexylbenzimidamide, N-(2,6-dimethylphenyl)-N-ethylbenzimidamide, N,N-dimethyl-1-naphthimidamide, N,N-diisopropyl-1-naphthimidamide, N,N-dicyclohexyl-1-naphthimidamide, N-(2,6-dimethylphenyl)-N-ethyl-1-naphthimidamide, N,N,2,6-tetra-methylbenzimidamide, N,N-diisopropyl-2,6-dimethylbenzimidamide, N,N-dicyclohexyl-2,6-dimethylbenzimidamide, N-(2,6-dimethylphenyl)-N-ethyl-2,6-dimethylbenz-imidamide, 2,6-difluoro-N,N-dimethylbenzimidamide, 2,6-difluoro-N,N-diisopropylbenzimidamide, N,N-dicyclohexyl-2,6-difluorobenzimidamide, N-(2,6-dimethylphenyl)-N-ethyl-2,6-difluorobenzimidamide, 2,6-dichloro-N,N-dimethylbenzimidamide, 2,6-dichloro-N,N-diisopropylbenzimidamide, 2,6-dichloro-N,N-dicyclohexylbenzimidamide, 2,6-dichloro-N-(2,6-dimethylphenyl)-N-ethylbenzimidamide. Preferred examples are 2,6-difluoro-N,N-piperidinylbenzamidine, 2,4-difluoro-N,N-diisopropylbenz-imidamide (2,4-difluoro-N,N-diisopropylbenzamidine), 2,4,6-trifluoro-N,N-diisopropylbenz-imidamide (2,4,6-trifluoro-N,N-diisopropylbenzamidine), 3,5-difluoro-N,N-diisopropylbenz-imidamide (3,5-difluoro-N,N-diisopropylbenzamidine), pentafluoro-N,N-diisopropylbenz-imidamide (pentafluoro-N,N-diisopropylbenzamidine), 2,6-difluoro-N,N-diisopropylbenz-imidamide (2,6-difluoro-N,N-diisopropylbenzamidine) and N,N-diisopropylbenzimidamide (N,N-diisopropylbenzamidine).

Another preferred embodiment of the present invention relates to a catalyst complex mixture of metal complexes of formula (1) and (2) having independently an L of the formula (3b)

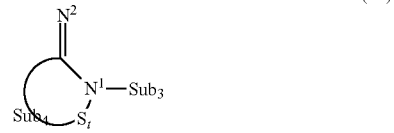

(3b)

wherein the amidine-containing ligand is covalently bonded to the metal M via the imine nitrogen atom $N^2$;

S is a —$CH_2$— unit, and t is the integer number denoting the number of S and is in the range of 1-4, more preferably in the range of 1-2, most preferably is 1;

Sub3 is an aliphatic or aromatic cyclic or linear substituent comprising a group 14 atom through which Sub3 is bonded to the amine nitrogen atom $N^1$;

Sub4 is an optionally substituted C2 unit in which the 2 carbon atoms may be $sp^2$ or $sp^3$ hybridized.

A preferred embodiment of the invention relates to a catalyst complex mixture of metal complexes of formula 1 and 2 wherein Sub3 is independently an alkyl, alkenyl, alkynyl with 1 to 20 carbon atoms or aromatic residue with 6 to 20 carbon atoms, which are in each case unsubstituted or substituted with halogen, amido, silyl or aryl radicals. Examples for such Sub3 are methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantyl, 1-butenyl, 2-butenyl and propenyl, unsubstituted phenyl or substituted phenyl residue, preferably phenyl, naphthyl, 2,6-dimethylphenyl, 2,6-dichlorophenyl or 2,6-difluorophenyl.

A preferred embodiment of the invention relates to a catalyst complex mixture of metal complexes of formula 1 and 2 wherein independently L of the formula 3b) has the general formula 3c)

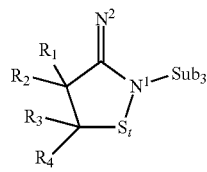

(3c)

wherein R₁-R₄ are the same or different and each represents a hydrogen atom, a halogen atom, an optionally substituted C1-10 alkyl group or an optionally substituted C1-10 alkoxy group, and S, t and Sub3 have the above mentioned meaning, or L of the formula 3b) has the general formula 3d)

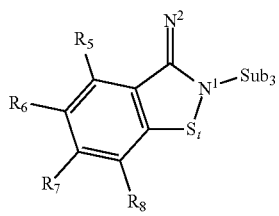

(3d)

wherein R₅-R₈ are the same or different and each represents a hydrogen atom, a halogen atom, an optionally substituted C1-10 alkyl group, an optionally substituted C1-10 alkoxy group, or the adjacent R₅-R₈ may be linked to form an aromatic ring optionally substituted, preferably unsubstituted, and S, t and Sub3 have the above mentioned meaning. Typical examples for preferred R₅-R₈ are hydrogen and fluorine.

In a preferred embodiment, in which L has the general form 3c) with R₁-R₄ each representing a hydrogen atom or 3d) with R₅-R₈ each representing a hydrogen atom or R₅ being a fluorine atom and with Sub3 being methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantly, 1-butenyl, 2-butenyl, propenyl, phenyl, naphthyl, 2,6-dimethylphenyl, 2,6-dichlorophenyl or 2,6-difluorophenyl, S means CH₂ and t is 1.

Cy

As used herein, the term cyclopentadienyl ligand is meant to broadly convey its conventional meaning, namely a substituted ligand having a five-membered carbon ring which is bonded to the metal via a π-type bonding usually in adopting η⁵-coordination to the metal.

R¹ and R² are substituents which, in case they are not hydrogen themselves, each substitute a hydrogen at the five-membered carbon ring. The substituents R¹ and R² may be formed as described below and may themselves be substituted and may thus bear substituents or not.

R² preliminary means aliphatic linear or branched radicals such as methyl, ethyl, n-propyl, allyl, iso-propyl, n-butyl, iso-butyl, sec-butyl, tert-butyl, n-pentyl, 3-pentyl, sec-pentyl, tert-pentyl, heptyl, octyl, nonyl, decyl cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl or aryl radicals including phenyl, benzyl, methylphenyl, trimethylphenyl, cyclohexylphenyl, napthyl, butylphenyl, or butyldimethylphenyl.

The $C_1$-$C_{20}$ substituents as of R² may also comprise heteroatomic substituents including halogens, in particular F, Cl and Br may be mentioned. Specific examples can include fluorophenyl, trifluoromethylphenyl and fluoromethyl, difluromethyl and trifluoromethyl. Furthermore group 15 and 16 elements such as nitrogen, phosphorous, oxygen and sulphur; for example, N,N-dimethylaminobenzyl, N,N-dimethylaminomethyl, methoxymethyl, diphenyl-phosphinomethyl, cyanoethyl and sulphur heterocylces. Preferably, the $C_1$-$C_{20}$ substituents as of R² are unsubstituted.

R¹ preferably means hydrogen, halogen, in particular F, Cl and Br and in particular R¹ means $C_3$-$C_{20}$ substituent such as aliphatic linear and branched radicals such as n-propyl, iso-propyl, allyl, n-butyl, iso-butyl, sec-butyl, tert-butyl, n-pentyl, 3-pentyl, sec-pentyl, tert-pentyl, heptyl, octyl, nonyl, decyl cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl or aryl radicals including phenyl, benzyl, methylphenyl, trimethylphenyl, cyclohexylphenyl, napthyl, butylphenyl, and butyldimethylphenyl.

The $C_3$-$C_{20}$ as of R¹ substituents may also being substituted by heteroatomic substituents including halogens, in particular F, Cl and Br. Specific examples can include fluorophenyl, trifluoromethylphenyl and fluoromethyl, difluromethyl and trifluoromethyl, furthermore group 15 and 16 elements such as nitrogen, phosphorous, oxygen and sulphur; for example, N,N-dimethylaminobenzyl, N,N-dimethylaminomethyl, methoxymethyl, diphenyl-phosphinomethyl, cyanoethyl and sulphur heterocycles. Preferably, the $C_3$-$C_{20}$ substituents as of R¹ are unsubstituted.

In a preferred embodiment R¹ means a $C_3$ to $C_{10}$ substituent and R² means methyl. More preferably R² means methyl and R¹ means a $C_3$ to $C_6$ radical. Most preferably R¹ means iso-propyl, cyclohexyl, allyl or a linear or branched butyl isomer, in particular n-butyl, s-butyl, iso-butyl or t-butyl and R² means methyl.

Cy may mean a cyclopentadienyl ring which is substituted with one $C_3$-$C_{20}$ hydrocarbyl substituent, which is bonded to the cyclopentadienyl ring via a tertiary or quaternary carbon atom and 4 methyl groups.

Generally, Cy preferably means a cyclopentadienyl ring which is, additionally to R¹, substituted with 4 methyl groups. In this case, it may preferably be provided that R¹ is H.

In a preferred embodiment the mixture of the present invention contains a metal complex of formula (1) of the present invention, wherein M is Ti, Z is selected from the group consisting of chlorine and $C_1$-$C_4$-alkyl, in particular methyl, p is 2

Cy is substituted with four methyl groups one of which is from R²=methyl and R¹ means a hydrogen or a $C_3$-$C_6$ aliphatic substituent, in particular iso-propyl, cyclohexyl, n-butyl, s-butyl, iso-butyl or t-butyl, allyl and L means N,N-diisopropylbenzamidinate, 2,6-difluoro-N,N-diisopropylbenzamidinate or 2,6-difluoro-N,N-piperidinylbenzamidine.

In

As used herein, the term indenyl (In) ligand is meant to broadly convey its conventional meaning, which is bonded to the metal via a π-type bonding usually in adopting η⁵-coordination to the metal. The indenyl ring may be unsubstituted or substituted by 1 to 7 substituents, in particular $C_1$-$C_{20}$ hydrocarbyl substituents, in particular one or more methyl groups. Preferably the indenyl ligand is unsubstituted. The one or more substituents each substitute a hydrogen at the indenyl ring. The one or more, especially 1 to 7, substituents $R^3$ may be formed as described above and may themselves be substituted and may thus bear substituents or not.

$R^3$ preliminary means aliphatic linear or branched radicals such as methyl, ethyl, n-propyl, allyl, iso-propyl, n-butyl, iso-butyl, sec-butyl, tert-butyl, n-pentyl, 3-pentyl, sec-pentyl, tert-pentyl, heptyl, octyl, nonyl, decyl cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl or aryl radicals including phenyl, benzyl, methylphenyl, trimethylphenyl, cyclohexylphenyl, napthyl, butylphenyl, or butyldimethylphenyl.

The $C_1$-$C_{20}$ substituents as of $R^3$ may also comprise heteroatomic substituents including halogens, in particular F, Cl and Br may be mentioned. Specific examples can include fluorophenyl, trifluoromethylphenyl and fluoromethyl, difluromethyl and trifluoromethyl. Furthermore group 15 and 16 elements such as nitrogen, phosphorous, oxygen and sulphur; for example, N,N-dimethylaminobenzyl, N,N-dimethylaminomethyl, methoxymethyl, diphenyl-phosphinomethyl, cyanoethyl and sulphur heterocylces.

Preferably, the $C_1$-$C_{20}$ substituents as of $R^3$ are unsubstituted.

In a preferred embodiment the mixture of the present invention contains a metal complex of formula (2) of the present invention, wherein M is Ti, Z is selected from the group consisting of chlorine and $C_1$-$C_4$-alkyl, in particular methyl, p is 2

In is an unsubstituted indenyl ligand and

L means N,N-diisopropylbenzamidinate, 2,6-difluoro-N,N-diisopropylbenzamidinate or 2,6-difluoro-N,N-piperidinylbenzamidine.

Mixture as Such

The weight ratio of the catalysts of formula (1) to formula (2) in the catalyst complex mixture according to the present invention is preferably from 50:1 to 1:50 in particular from to 1:1 to 1:20 more preferred from 1:5 to 1:15.

The mixture may contain further other catalysts, preferably it contains in total more than 95 wt.-%, in particular more than 99 wt.-% of catalysts of the formula (1) and (2).

The inventions also refers to a catalyst system comprising
a) a catalyst complex mixture according to the present invention,
b) an activator and
c) optionally a scavenger.

A scavenger c) is a compound that reacts with impurities present in the process of the invention, which are poisonous to the catalyst.

In a preferred embodiment of the present invention the scavenger c) as of the catalyst system is a hydrocarbyl of a metal or metalloid of group 1-13 or its reaction products with at least one sterically hindered compound containing a group 15 or 16 atom.

Preferably, the group 15 or 16 atom of the sterically hindered compound bears a proton. Examples of these sterically hindered compounds are tert-butanol, iso-propanol, triphenylcarbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, HMDS (hexamethyldisilazane), diisopropylamine, di-tert-butylamine, diphenylamine and the like. Some non-limiting examples of scavengers are organoaluminium compounds (E), butyllithium including its isomers, dihydrocarbylmagnesium, and hydrocarbylzinc and their reaction products with a sterically hindered compound or an acid, such as HF, HCl, HBr, HI. Furthermore organoaluminium compounds (E) as defined below can be used as activator b), in particular hydrocarbylaluminoxanes like methylaluminoxane (MAO).

Activators of the component b) for single-site catalysts are fairly well known in the art. These activators often comprise a group 13 atom, such as boron or aluminium. Examples of these activators are described in *Chem. Rev.*, 2000, 100, 1391 by E. Y-X. Chen and T. J. Marks. A preferred activator b) is a borane (C1), a borate (C2, C3) or an organoaluminum compound (E) like alkylaluminoxane such as methyl aluminoxane (MAO). The activator for activation preferably is any boron compound of the following (C1) to (C3) and/or an organoaluminum compound (E). The organoaluminum compound (E) may be employed as a scavenger and/or an activator.

The preferred activator b) and scavengers c) are the same as mentioned in EP 2816050 which is for these two components hereby incorporated by reference.

Polymerisation Process

The invention also relates to a process for the preparation of a polymer by polymerizing at least one olefinic monomer comprising contacting said monomer with a catalyst complex mixture or a catalyst system according to the present invention.

The preferred process for polymerization is generally concluded in the gas phase, in slurry, or in solution in an inert solvent, preferably a hydrocarbon solvent.

Such polymerisation could take place in different polymerisation zones. A polymerisation zone is a vessel where a polymerisation takes place and could be either a batch reactor or a continuous reactor. When multiple reactors are employed (being them connected in series or in a parallel configuration), each reactor is considered as a separate polymerisation zone.

The two or more catalyst systems can be premixed with the activators or mixed within the polymerisation zone. Similarly, the two or more catalyst systems may be premixed and fed to the polymerisation zone together or added separately for mixture in situ. As such, the additions and mixing may be continuous or batch wise and the same or different activators can be used for each catalyst system.

Suitable solvents are in the gas phase, in slurry, or in solution in an inert solvent preferable a hydrocarbon solvent. Suitable solvents are a $C_{5-12}$ hydrocarbon such as pentane, hexane, heptane, octane, isomers and mixtures thereof, cyclohexane, methylcyclohexane, pentamethyl heptane and hydrogenated naphtha. The process of the invention may be conducted at temperatures from 10 to 250° C., depending on the product being made. Most preferably the polymerisation is performed at temperatures greater than 80° C.

Monomers

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such a-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These a-olefins may be used in combination.

Preferred examples of the α-olefin of the ethylene-α-olefin-non-conjugated diene copolymer contained in ethylene-α-olefin-non-conjugated-diene copolymer of the present invention are propylene, 1-butene, 1-pentene, 1-hexene, 4-methyl-1-pentene, 1-octene and 1-decene. Of these, propylene and 1-butene are preferred. Propylene is the most preferred.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallyl-cyclohexane, 1-allyl-5-vinylcyclooctane, 1,5-diallylcyclooctane, 1-allyl-4-isopropenyl-cyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene and vinylcyclohexene.

Examples of aromatic polyenes are divinylbenzene (including its isomers), trivinyl-benzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and copolymers on the basis of 3 or more of the above-mentioned olefinic monomers and also blends thereof can be prepared with the process of the present invention.

In a preferred embodiment the polymerization process is characterized wherein ethylene, at least one $C_3$-$C_{12}$-α-olefin and at least one non-conjugated diene is used as olefinic monomers.

In a preferred embodiment the polymerization process is characterized wherein at least one non-conjugated polyene is used, in which among the carbon-carbon double bonds, two carbon-carbon double bonds polymerizable with a metallocene catalyst are present in one molecule. This definition is for instance known from EP2354170.

Preferably, such non-conjugated polyenes are selected from the group consisting of 5-alkenyl-2-norbornene, e.g., 5-vinyl-2-norbornene (VNB) and 5-allyl-2-norbornene; alicyclic polyenes, e.g., 2,5-norbornadiene, dicyclopentadiene (DCPD), and tetracyclo[4,4,0,1$^{2.5}$,1$^{7.10}$] deca-3,8-diene; and α, ω-dienes, e.g., 1,7-octadiene, and 1,9-decadiene. Among them, 5-vinyl-2-norbornene (VNB), dicyclopentadiene, 2,5-norbornadiene, 1,7-octadiene, and 1,9-decadiene are preferable, and 5-vinyl-2-norbornene (VNB) is particularly preferable.

In a preferred embodiment, copolymers on the basis of ethylene, at least one $C_{3-12}$ alpha olefin, preferably propylene and at least one non-conjugated diene, preferably a diene selected from the group consisting of 5-methylene-2-norbornene, 5-ethylidene-2-norbornene (ENB), 5-vinylnorbornene, 2,5-norbornadiene, dicyclopentadiene (DCPD) and vinylcyclohexene, more preferably from the group consisting of 5-ethylidene-2-norbornene and 5-vinylnorbornene are made with two or more metal complexes of the present invention.

In a preferred embodiment, a diene combination of 5-ethylidene-2-norbornene and 5-vinylnorbornene is employed.

The present invention also relates to Polymers obtainable with the catalyst complex mixture or a catalyst system according to the present invention.

Polymer

With respect to the preferred polymer, in particular ethylene-α-olefin-non-conjugated diene copolymer, which can be obtained by the process of the present invention, such polymer can be preferably further described as follows.

The preferred content of the structural unit derived from the ethylene monomer is 70% by weight of the polymer or lower, in particular ≤65 wt. %. A more preferred ethylene content is from 40 to 65 wt. %, in particular from 45 to 60 wt. %.

Preferably, the content of the structural unit derived from the diene monomer of the polymer is 2 to 12% by weight of the ethylene-α-olefin-non-conjugated-diene copolymer.

Preferably the sum of ethylene, non-conjugated diene(s) and α-olefin is higher than 99 wt. %, in particular 100 wt. % of the monomers.

In a preferred embodiment the Mooney viscosity of the ethylene-α-olefin-non-conjugated-diene copolymer i) ML (1+4) at 125° C. is ≥20 MU, in particular 20 to 200 MU.

The ethylene-α-olefin-non-conjugated-diene copolymer preferably does have a weight average molecular weight (Mw) (measured by high temperature gel permeation chromatography (GPC), using a calibration curve prepared using a standard ethylene-propylene copolymer) of at least 40,000 g/mol, in particular from 40,000 to 800,000 g/mol.

Also preferred is an ethylene-α-olefin-non-conjugated diene copolymer having a polydispersity, namely, weight average molecular weight/number average molecular weight (Mw/Mn), measured by high temperature GPC of higher than 3.5, preferably higher than 4.0.

Furthermore, the ethylene-α-olefin-non-conjugated-diene copolymer is preferably branched with a $\Delta\delta$ between 0 and 50, more preferred is a $\Delta\delta$ between 2 and 20, even more preferred is a $\Delta\delta$ between 2 and 18.

$\Delta\delta$ is, expressed in degrees, the difference between the phase angle $\delta$ at a frequency of 0.1 rad/s and the phase angle $\delta$ at a frequency of 100 rad/s, as determined by Dynamic Mechanical Spectroscopy (DMS) at 125° C. This quantity $\Delta\delta$ is a measure for the amount of long chain branched structures present in the polymer and has been introduced in H. C. Booij, Kautschuk+Gummi Kunststoffe, Vol. 44, No. 2, pages 128-130, which is incorporated herein by reference.

Such a $\Delta\delta$ value can in particular be achieved with the use of small amounts of VNB as diene preferably additionally used to the ENB diene. A preferred amount of structural units derived from VNB monomer, as amount of vinyl side unsaturations, is between 0.05 and 3.0 wt. %, in particular between 0.1 and 1.5 wt. %.

Hence, the polymers obtained by using the catalyst complex mixture of the present invention for the polymerization show improved and unexpected properties. In particular the properties are very good for polymers that contain at least one non-conjugated polyene is used, in which among the carbon-carbon double bonds, two carbon-carbon double bonds polymerizable with a metallocene catalyst are present in one molecule, in particular VNB. In particular it shall be noted that the use of a catalyst complex mixture not only provides the polymers that would have been obtained by a mixture of polymer obtained with the respective single catalyst but also polymer chains built up by the contribution of both catalysts.

Below, the invention will be elucidated on the basis of the following examples and comparative experiments, without being limited thereto.

EXAMPLES

Test Methods.
IAV Molecular Characterisation, Code: SEC-HT-2 (universal calculation)
Chromatography: PolymerChar SEC (System ID: HT-SEC1).
Detection: PolymerCharV-400 viscometer; IR5 detector.
Column set: three Polymer Laboratories 13 μm PLgel Olexis, 300×7.5 mm.
PE molar mass calibration was performed with linear PE standards.
PP molar mass calibration: linear PE standard were used for calibration of the system. A PP molar mass calibration was obtained after conversion from PE to PP using the Mark-Houwink constants of PE and PP.
Temperature: 160° C.
Solvent/eluent: TCB or 1,2,4 tri-chlorobenzene with added DCBD stabilizer
Flow: 1 ml/min Fourier transformation infrared spectroscopy (FT-IR), was used to determine the composition of the copolymers according to ASTM D 3900 and D 6047 on pressed polymer films.

Mooney viscosity ML(1+4) @ 125° C. is measured according to ISO 289, the degree of branching as indicated by the parameter as explained in H. C. Booij, Kautsch. Gummi Kunstst. 44 (1991) 128.

Part 1—Synthesis of Ligands and Compounds

General

All manipulations were carried out using standard Schlenk line or dry-box techniques under an atmosphere of argon or dinitrogen. Solvents were degassed by bubbling with dinitrogen and dried by passing through a column of the appropriate drying agent. Toluene was refluxed over sodium and distilled. Deuterated solvents were dried over potassium ($C_6D_6$) or $P_2O_5$ ($CDCl_3$ and $CD_2Cl_2$), distilled under reduced pressure and stored under dinitrogen in Teflon valve ampoules. NMR samples were prepared under dinitrogen in 5 mm Wilmad 507-PP tubes fitted with J. Young Teflon valves. $^1H$ and $^{13}C$-{$^1H$} spectra were recorded at ambient temperature and referenced internally to residual protio-solvent ($^1H$) or solvent ($^{13}C$) resonances, and are reported relative to tetramethylsilane (d=0 ppm). Chemical shifts are quoted in $\delta$ (ppm) and coupling constants in Hz.

Synthesis of Ligands, Metal Precursors and Organometallics Compounds

Ligand A—$HNC(2,6-C_6H_3F_2)(NC_5H_{10})$

To a piperidine (5 mL, 50.6 mmol) solution in toluene (20 mL) was added MeMgCl (3.0 M in THF, 16.9 mL, 50.6 mmol). The solution was heated to 50° C., for two hours before allowing to cool to room temperature and transferring using a cannula to a solution of 2,6-difluorobenzonitrile (7.03 g, 50.6 mmol) in toluene (20 mL). The solution was stirred for 16 h at room temperature after which time the reaction was quenched by addition of water (1 mL). After stirring for an hour, anhydrous sodium sulfate was added and the solution was then filtered to remove salts. The clear solution was then washed with brine (2×40 mL) before removal of the volatiles under reduced pressure to yield a viscous yellow oil. This was then diluted with another portion of hexanes (15 mL) and placed at −20° C. for two days resulting in crystallization of the desired product. Yield=8.7 g (77%). $^1H$ NMR (300 MHz) (CDCl3) $\delta$ (ppm): 7.24 (m, 1H, Ar); 6.86 (m, 2H, Ar); 6.06 (m, 1H, NH), 3.33 (br m, 4H, $NCH_2$), 1.53 (br m, 6H, $CH_2CH_2CH_2$) ppm. $^{19}F$-NMR (282 MHz, $CDCl_3$) $\delta$: −113.30 ppm.

Metal precursor A—$(CH_3)_4(CH(CH_3)_2)Cp-Ti-Cl_3$

To a THF solution of 2,3,4,5-Tetramethyl-2-cyclopentenone was added one equivalent of a isopropylmagnesium bromide solution and the resulting yellow solution was refluxed for 8 h. Following cooling of the solution to 0° C., the reaction was quenched with 25 ml of HCl (1M solution), warmed slowly to room temperature and stirred for a further 2 h. After addition of $Et_2O$, the phases were separated and the organic phase was washed with water followed by brine. The combined aqueous phases were extracted with $Et_2O$ and dried over $Na_2SO_4$. Removal of the volatiles under reduced pressure afforded the crude product as an orange oil. The compound was purified using column chromatography (silica gel; n-hexanes).

To an hexane solution of the substituted cyclopentene, cooled to −78° C., was added dropwise a solution of n-BuLi. The solution was then allowed to warm slowly to room temperature before being stirred for 16 h. The precipitated lithium salt was then collected by filtration, washed with hexanes and dried carefully under reduced pressure. The air-sensitive lithium salt was highly insoluble precluding characterization and was used subsequently without further purification.

To a THF solution of the lithium salt was added carefully TMSCl. The mixture was stirred at room temperature for 16 h. The volatiles were removed in vacuo and the resulting residue was extracted into hexanes. Removal of hexanes under reduced pressure afforded the desired product.

To a toluene solution of TMS substituted cyclopentadienyl compound was added a titanium tetrachloride solution. The mixture was stirred at room temperature for 48 h. The product was extracted into toluene and the volatiles were subsequently removed in vacuo. The resulting solid was washed with hexane and dried under reduced pressure affording the final product.

$^1$H NMR (C$_6$D$_6$, 300 MHz) δ (ppm): 3.13 (hept, J=7.1 Hz, (CH$_3$)$_2$CH, 1H), 2.08 (s, CpCH$_3$, 6H), 1.87 (s, CpCH$_3$, 6H), 1.04 (d, J=7.1 Hz, (CH$_3$)$_2$CH, 6H). $^{13}$C NMR (CDCl$_3$, 75 MHz) δ (ppm): 147.52 (CCH), 138.35 (CCH$_3$), 136.40 (CCH$_3$), 30.16 (CH(CH$_3$)$_2$), 21.91 ((CH$_3$)$_2$CH), 14.81 (CCH$_3$), 14.05 (CCH$_3$).

CAT A—Cl (CH$_3$)$_4$(CH(CH$_3$)$_2$)Cp-Ti—Cl$_2$)(NC(2,6-C$_6$H$_3$F$_2$)(NC$_5$H$_{10}$)

To a toluene (50 mL) solution of isopropyltetramethyl-cyclopentadienyltitanium(IV)trichloride (3.50 g, 11.0 mmol) and ligand A (2.47 g, 11.0 mmol) was added trimethylamine (6.15 mL, 44.1 mmol). The mixture was stirred at room temperature for 16 h. The dried crude product was extracted into toluene (3×20 mL) and the volatiles were subsequently removed in vacuo affording a yellow microcrystalline solid in quantitative yield.

Yield=5.50 g, (99%)—yellow solid—$^1$H NMR (CDCl$_3$, 300 MHz) δ (ppm): 7.30-7.17 (m, p-ArH, 1H), 6.95-6.82 (m, m-ArH, 1H), 3.74-3.60 (m, NCH$_2$, 2H), 3.18-3.07 (m, NCH$_2$, 2H), 2.95 (hept, J=7.1 Hz, (CH$_3$)$_2$CH, 1H), 2.12 (s, CpCH$_3$, 6H), 1.96 (s, CpCH$_3$, 6H), 1.62 (m, NCH$_2$CH$_2$, 4H), 1.55-1.40 (m, NCH$_2$CH$_2$CH$_2$, 2H), 0.99 (d, J=7.1 Hz, (CH$_3$)$_2$CH, 6H). $^{13}$C NMR (CDCl$_3$, 75 MHz) δ (ppm): 158.75 (dd, J=251.1, 7.3 Hz, o-Ar), 151.25 (NCN), 137.32 (CCH), 130.89 (t, J=9.7 Hz, p-Ar), 128.35 (CCH$_3$), 126.93 (CCH$_3$), 112.47 (t, J=22.5 Hz, i-Ar), 111.82 (m, m-Ar), 49.25 (NCH$_2$), 45.88 9 (NCH$_2$), 28.75 (CH(CH$_3$)$_2$), 26.73 (NCH$_2$CH$_2$), 26.02 (NCH$_2$CH$_2$), 24.46 (NCH$_2$CH$_2$), 22.18 ((CH$_3$)$_2$CH), 13.61 (CCH$_3$), 12.81 (CCH$_3$). $^{19}$F NMR (CDCl$_3$, 282 MHz) δ (ppm): −111.17 (s) Anal. Calc. for C$_{24}$H$_{32}$Cl$_2$F$_2$N$_2$Ti: C, 57.05; H, 6.38; N, 5.54. Found: C, 56.93 and 56.92; H, 6.33 and 6.29; N, 5.58 and 5.56

CAT A—(CH$_3$)$_4$(CH(CH$_3$)$_2$)Cp-Ti—(CH$_3$)$_2$)(NC(2,6-C$_6$H$_3$F$_2$)(NC$_5$H$_{10}$) (Known from Example 23 of EP3272761)

To a toluene solution of CAT A-Cl (5.500 g, 10.88 mmol) was added methylmagnesium bromide (7.7 mL, 3.0 M, 23.15 mmol) and the mixture was stirred for 16 hours. Residual Grignard was quenched with TMSCl (0.84 mL, 6.61 mmol) and stirred for another 2 hours. The dried crude product was extracted with hexanes (3×20 mL) and the volatiles were subsequently removed in vacuo affording a yellow solid.

Yield=3.60 g (71%)—yellow solid—$^1$H NMR (C$_6$D$_6$, 300 MHz) δ (ppm): 6.76-6.20 (m, ArH, 3H), 4.01-3.39 (m, NCH$_2$, 2H), 3.08-2.80 (m, NCH$_2$, 2H), 2.92 (hept, J=7.0 Hz, (CH$_3$)$_2$CH, 1H), 2.05 (s, CpCH$_3$, 6H), 1.96 (s, CpCH$_3$, 6H), 1.53-1.32 (m, NCH$_2$CH$_2$, 2H), 1.21 (q, NCH$_2$CH$_2$CH$_2$, 4H), 1.16 (d, J=7.1 Hz, (CH$_3$)$_2$CH, 6H), 0.58 (s, Ti(CH$_3$)$_2$, 6H). $^{13}$C NMR (CDCl$_3$, 75 MHz) δ (ppm): 159.64 (dd, J=248.4, 7.9 Hz, o-Ar), 146.48 (NCN), 131.43 (CCH), 129.54 (t, J=9.7 Hz, p-Ar), 121.60 (CCH$_3$), 118.79 (CCH$_3$), 112.14-111.40 (m, i-Ar), 48.80 (NCH$_2$), 48.34 (Ti(CH$_3$)$_2$), 44.74 (NCH$_2$), 28.58 (CH(CH$_3$)$_2$), 27.17 (NCH$_2$CH$_2$), 26.35 (NCH$_2$CH$_2$), 25.25 (NCH$_2$CH$_2$CH$_2$), 23.24 ((CH$_3$)$_2$CH), 12.96 (CCH$_3$), 12.30 (CCH$_3$). $^{19}$F NMR (CDCl$_3$, 282 MHz) δ (ppm): −113.11 (s)

CAT B-Cl (Ind)-TiCl$_2$(NC(C$_6$H$_5$)(N((CH(CH$_3$)$_2$)$_2$)

To a solution of N,N-diisopropylbenzamidine (0.500 g, 2.45 mmol) and Indenyl-TiCl$_3$ (0.659 g, 2.45 mmol) in toluene (30 mL), was added triethylamine (1.35 mL) and the mixture was stirred overnight at 50° C., filtered and concentrated in vacuo. The crude product was dissolved in a minimal amount of hot toluene, and left to crystalise for 5 days, yielding bright red crystals (100 mg, 10%) which contained toluene of crystalisation (0.66 eq. or 14 wt.-%).

1H-NMR (300 MHz, CDCl$_3$) δ: 7.54-7.01 (9H, ArH); 6.08 (2H, d, J=3.4 Hz, IndH); 5.97 (1H, t, J=3.4 Hz, IndH), 3.88-3.39 (2H, m, CH(CH3)2), 1.57 (6H, d, J=6.9 Hz, CH(CH3)2), 1.07 (6H, d, J=6.7 Hz, CH(CH3)2).

13C-NMR (75 MHz, CDCl3) δ: 165.18 (iPr2NC=N), 137.93, 129.63, 129.08, 127.74, 126.02, 125.80, 125.15, 116.83, 107.15, 53.10 (CH(CH3)2), 49.04 (CH(CH3)2), 20.44 (d, J=12.0 Hz, CH(CH3)2).

Anal. Found (calcd. for C22H26Cl2N2Ti): C, 60.44 (60.64); H, 5.99 (6.05); N, 6.41 (6.42)

CAT B—(Indenyl)-Ti(CH$_3$)$_2$(NC(C$_6$H$_5$)(N((CH(CH$_3$)$_2$)$_2$)

To a toluene solution of CAT-B-Cl, three equivalents of MeMgBr were added. Mixture was allowed to stir for 64 hours before toluene removed, stripped with hexanes and filtration was carried out in hexanes. A series of recrystalisations in hexanes gave provided the final product.

$^1$H NMR (300.1 MHz, C6D6, R.T.): δ 7.50 (m, ArH, 2H), 7.14-6.99 (m, ArH, 7H), 5.99 (d, 1-3Ind, 2H), 5.39 (s, 2-Ind-H, 1H), 3.33, (Me2CH, 2H), 1.22 (br, (CH3)2CH, 12H), 0.304 (s, Ti(CH3), 6H).

Part II—EPDM Co-Polymerizations (Table 1)

The polymerisation experiments were carried out in a solution polymerisation reactor with a volume of 3 L. The feed streams were purified by contacting with various absorption media to remove catalyst-killing impurities such as water, oxygen and polar compounds as is known to those skilled in the art. The process is continuous in all feed streams. Premixed hexane (C6), propene, ethylene, diene, hydrogen, tri-isobutyl aluminium (TIBA) and the -2,6-di-tertbutyl-4-methyl-phenol were precooled before being fed to the reactor. The solution containing the metal organic compounds (CAT A/CAT B) and triphenylcarbenium tetrakis-perfluorophenylborate were fed separately to the reactor. The hydrogen content was adjusted to achieve the desired polymer Mooney as given in Table 1 and 2. The polymer solution was continuously removed through a discharge line, where a solution of Irganox® 1076 in iso-propanol was added and subsequently worked up by continuously steam stripping.

The final EPDM sample was obtained after batchwise drying of the polymer on a 2-roll mill.

EPDM was obtained after batch wise drying of the polymer on a mill. The polymers were analysed using FTIR for composition, Mooney viscosity (ML(1+4) 125° C.) and SEC-DV for the molecular weight and molecular weight distribution and dynamic mechanical spectroscopy (DMS) for delta delta parameter.

TABLE 1

EPDM polymerisation results with CAT A and CAT B

| Example | CAT ratio A/B* | Prod** (ppmM) | VNB (mmol/h) | $H_2$ (NL/h) | ML (1 + 4) 125° C. | Δδ (°) | C2 (wt %) | ENB (wt %) | VNB (wt %) | Mn (KDa) | Mw (KDa) | Mz (KDa) | Mw Mn | Mw Mw |
|---|---|---|---|---|---|---|---|---|---|---|---|---|---|---|
| Comp. Exp. | 1/0 | 0.76 | 47.6 | 0.25 | 80 | 19 | 49.9 | 5.5 | 0.13 | 83 | 308 | 841 | 3.7 | 2.7 |
| Exp. 1 | 1/3 | 0.93 | 35.7 | 0.08 | 88 | 12 | 48.6 | 7.0 | 0.11 | 89 | 360 | 1000 | 4.0 | 2.8 |
| Exp. 2 | 1/9 | 0.87 | 35.7 | 0.03 | 77 | 10 | 48.6 | 7.2 | 0.27 | 72 | 330 | 1200 | 4.6 | 3.6 |
| Exp. 3 | 1/9 | 1.01 | 71.4 | 0.15 | 76 | 4 | 49 | 7.2 | 0.50 | 62 | 390 | 1800 | 6.3 | 4.6 |

*Catalyst equivalents ratio
**Catalyst productivity expressed as residual metal

Conditions: Trea2=90° C., Scavenger=TIBA/BHT 1/1 molar ratio, 0.75 mmol/h, Activator=TBF20, B/Ti 2/1 molar ratio All the experiments were performed premixing the catalysts in the burette prior to the injection to the reactor.

In order to compare the properties of the used catalyst a EPDM polymer was targeted having a Mooney (1+4) @125° C. of 82+/−6 ML.

As it is possible to see from table 1, the use of a catalyst complex mixture enables the production of a polymer of broader MWD and higher branching, at similar or even lower VNB feed (example 1 vs comparative example) with respect to the polymer obtained with one catalyst.

A change in the catalyst ratio further broadens the MWD and increases the branching level (compare example 2 vs example 1 and vs comparative example).

Increasing the VNB feed further increases the branching level and broadens the MWD (compare example 3 vs example 2).

As it is possible to see from table 1, the use of a catalyst complex mixture enables, unexpectedly, the control of both the MWD and the branching level of the polymer.

Part II—EPDM Compound Evaluation—(Tables 2, 3 and 4)

Mixing Part

All compounds were prepared on an internal mixer (GK1,5 E1 from Harburg-Freudenberger Maschinenbau GmbH; ram pressure 8 bar, 50 rpm, 72% degree of filling and total mixing time 5 min). Chemicals of the curing system were added on an open mill (200 mm roll diameter; 20 rpm, 40° C. roll temperature and friction 1.22). The composition is achieved following the recipe of table 2.

TABLE 2

Compound recipe employed for the compound evaluation

| Ingredient | Chemical composition | Amount, phr |
|---|---|---|
| EPDM | EPDM polymer obtained according to examples | 100 |
| SUNPAR ® 2280 | Paraffinic oil | 39 |
| RU CORAX ® N 550 | carbon black | 60 |
| EDENOR ® C18-98 MY | Stearic acid | 1 |
| RHENOGRAN ® S-80 | 80% sulfur on carrier | 1.25 |
| ZINKOXYD AKTIV | Zinc Oxide | 5 |
| RHENOGRAN ® CAO 80 | 80% Calcium oxide on carrier | 5 |
| RHENOGRAN ® MBTS-80 | 80% dibenzothazole disulfide on carrier | 1.31 |
| RHENOGRAN ® TP-50 | 50% zinc dialkyldithiophosphate on carrier | 3.5 |
| RHENOGRAN ® ZBEC-70 | 70% zinc-dibenzyl-dithiocarbamate on carrier | 0.7 |
| VULKALENT ® E/C | N-phenyl-N-(trichloromethylsulfenyl)-benzene sulphonamide | 0.5 |
| Total loading | | 217.26 |

Curing of the Specimens

Test specimens have been prepared for all compounds by curing test plates of 2 mm and 6 mm thickness at 180° C. to a time equivalent to 1.1 and 1.25 times t90 (t90 is the time to reach 90% of maximum torque during the rheometer measurement).

Various mechanical and elastic properties were measured in accordance with the test methods listed in Table 3.

TABLE 3

Test methods

| Method | Standard | Characteristic | abbreviation | unit |
|---|---|---|---|---|
| compound | | | | |
| Mooney viscosity | DIN 53523-3 | Mooney viscosity (1 + 4) @ 100° C. | compound ML | (MU) |
| rheometry vulcanisate | DIN 53529 | torque difference MH-ML @ 180° C. | dS | (dNm) |
| hardness | DIN ISO 7619-1 | Hardness | H | (Sh A) |
| tensile test | DIN ISO 37 | elongation at break | EB | (%) |
| | | tensile strength at bread | TS | (MPa) |

TABLE 3-continued

Test methods

| Method | Standard | Characteristic | abbreviation | unit |
|---|---|---|---|---|
| Delft tear test | ISO 34-2 | tear resistance | Tear | (N/mm) |
| compression set test | DIN ISO 815 | compression set for 24 h @ 100° C. | CS @ 100° C. | (%) |
| | | compression set for 24 h @ 70° C. | CS @ 70° C. | (%) |
| | | compression set for 24 h @ 23° C. | CS @ 23° C. | (%) |
| Garvey | | | | |
| extrusion | internal protocol | extrusion of Garvey like profiles | | |
| | head Temp. | Temperature of the head screw, ° C. | | |
| | extrustion speed | 50 rpm | | |
| | measuring time | 60 sec | | |
| | string length | 125 mm | | |
| | die diameter | 4 mm | | |
| evaluation | ASTM D2230 | rating of the extruded strips according to system B | Score* | |

*visually determined according to ASTM D2230. The compound performances results are summarised in table 4.

TABLE 4

Compound evaluations according to the tests of table 3.

| | Mw Mn | Δδ (°) | ML* (1 + 4), 100° C. | TS (MPa) | EB (%) | CS, % (24 h/ 100° C.) | CS, % (24 h/ 70° C.) | CS, % (72 h/ 23° C.) | H shore A | dS, dNm | Score, (Garvey) |
|---|---|---|---|---|---|---|---|---|---|---|---|
| Comp. Exp. | 3.7 | 19 | 71 | 12 | 403 | 34 | 10 | 5 | 58 | 16 | 3 |
| Exp. 1 | 4.1 | 12 | 70 | 18 | 507 | 32 | 10 | 5 | 59 | 17 | 3 |
| Exp. 2 | 4.5 | 10 | 60 | 16 | 471 | 31 | 10 | 5 | 59 | 17 | 7 |
| Exp. 3 | 6.3 | 4 | 52 | 16 | 446 | 33 | 11 | 5 | 58 | 16 | 11 |

Profiles of the Garvey die quality for the compounds of table 4 can be seen in FIG. 1.

As it is possible to see from table 4, the comparative example features low levels of physical performances (tensile strength) and low quality in extrusion (Garvey die score and FIG. 1).

The use of a catalyst complex mixture according to the present invention enables higher branching (experiment 1) with higher physical performances. Further increase in branching and broadening in MWD brings both higher physical properties and increases the quality of the extrudates (experiments 2 and 3, see FIG. 1).

The invention claimed is:

1. A catalyst complex mixture containing at least one metal complex according to the formula (1)

CyLMZ$_p$      (1), and at least one metal complex according to the formula (2)

InLMZ$_p$      (2), wherein
Cy is a substituted cyclopentadienyl ligand that contains the substituents $R^1$, $R^2$ and 3 additional methyl groups, wherein
$R^1$ means H, halogen or a $C_3$-$C_{20}$ substituent, wherein the $C_3$-$C_{20}$ substituent is an aliphatic or an aryl radical containing from 3 to 23 carbon atoms and wherein the $C_3$-$C_{20}$ substituent optionally contains heteroatoms selected from the group consisting of halogens, nitrogen, phosphorous, oxygen and sulphur;

and
$R^2$ means a $C_1$-$C_{20}$ substituent, wherein the $C_1$-$C_{20}$ substituent is an aliphatic or an aryl radical containing from 1 to 20 carbon atoms wherein the $C_1$-$C_{20}$ substituent optionally contains heteroatoms selected from the group consisting of halogens, nitrogen, phosphorous, oxygen and sulphur;
In is an indenyl ligand, optionally substituted with one or more substituents $R^3$, wherein the one or more substituents $R^3$ mean independently $C_1$-$C_{20}$ hydrocarbyl substituents,
and for each formula (1) and (2) respectively
M is a group 4 metal
Z independently is an anionic ligand,
p is number of 1 to 2, preferably 2, and
L is an amidinate-type ligand of the formula (3)

wherein the amidine-containing ligand is covalently bonded to the metal M via the imine nitrogen atom, and Sub$_1$ is a substituent comprising a group 14 atom through which Sub$_1$ is bonded to the imine carbon atom and Sub$_2$ is a substituent comprising a heteroatom of group 15, through which Sub$_2$ is bonded to the imine carbon atom.

2. The catalyst complex mixture according to claim 1 wherein M in formula (1) and (2) respectively is titanium.

3. The catalyst complex mixture according to claim 1, wherein in formula (1) and (2) respectively Z independently means a halogen atom, a $C_{1-10}$ alkyl group, a $C_{7-20}$ aralkyl group, a $C_{6-20}$ aryl group or a $C_{1-20}$ hydrocarbon-substituted amino group.

4. The catalyst complex mixture according to claim 1, wherein in formula (1) and (2) respectively independently of each other ligand L of formula (2) $Sub_1$ is an substituted or unsubstituted aryl residue selected from the group consisting of phenyl, 2,6-dimethylphenyl, 2,6-dichlorophenyl or 2,6-difluorophenyl.

5. The catalyst complex mixture according to claim 1, wherein in formula (1) and (2) respectively independently of each other ligand L of formula (2) $Sub_2$ is of the general formula $-NR^4R^5$ with $R^4$ and $R^5$ being individually selected from the group consisting of aliphatic $C_{1-20}$ hydrocarbyl, halogenated $C_{1-20}$ aliphatic hydrocarbyl, aromatic $C_{6-20}$ hydrocarbyl and halogenated aromatic $C_{6-20}$ hydrocarbonyl residues or $R^4$ optionally forming a heterocyclic ring with $R^5$ or $Sub_1$.

6. The catalyst complex mixture according to claim 1, wherein in formula (1) Cy means a cyclopentadienyl ring which is substituted with one $C_3-C_{20}$ hydrocarbyl substituent, which is bonded to the cyclopentadienyl ring via a secondary or tertiary carbon atom and 4 methyl groups.

7. The catalyst complex mixture according to claim 1, wherein in formula (1) Cy means a cyclopentadienyl ring which is substituted with 4 methyl groups.

8. The catalyst complex mixture according to claim 1, wherein the weight ratio of the catalysts of formula (1) to formula (2) is from 50:1 to 1:50, in particular from to 1:1 to 1:20, more preferred from 1:5 to 1:15.

9. The catalyst complex mixture according to claim 1, wherein in formula (1) ligand L of formula (3) $Sub_1$ is selected from the group consisting of phenyl, 2,6-diemthylphenyl, 2,6-dichlorophenyl or 2,6-difluorophenyl and $Sub_2$ is selected from the group consisting of dimethylamino, diisopropylamino, biscyclohexylamino or piperidinyl.

10. The catalyst complex mixture according to claim 1, wherein in formula (2) ligand L of formula (3) $Sub_1$ is selected from the group consisting of phenyl, 2,6-diemthylphenyl, 2,6-dichlorophenyl or 2,6-difluorophenyl and $Sub_2$ is selected from the group consisting of 1-piperidinyl.

11. A catalyst system comprising
   a) a catalyst complex mixture according to claim 1,
   b) an activator and
   c) optionally a scavenger.

12. Process for the preparation of a polymer by polymerizing at least one olefinic monomer comprising contacting said monomer with the catalyst system according to claim 11.

13. A process according to claim 12 wherein ethylene, at least one $C_3-C_{12}$-α-olefin and at least one non-conjugated diene are used as olefinic monomers.

14. A process according to claim 12, wherein ethylene, at least one C3-C12-α-olefin and at least one non-conjugated diene selected from the group consisting of 5-methylene-2-norbornene 5-ethylidene-2-norbornene, 5-vinylnorbornene, 2,5-norbornadiene, dicyclo-pentadiene and vinylcyclohexene, in particular from the group consisting of 5-ethylidene-2-norbornene and 5-vinylnorbornene are used as olefinic monomers.

15. A process for the preparation of a polymer by polymerizing at least one olefinic monomer comprising contacting said monomer with a catalyst system according to claim 11.

16. A process according to claim 15 wherein ethylene, at least one $C_3-C_{12}$-α-olefin and at least one non-conjugated diene is used as olefinic monomers.

* * * * *